United States Patent
Wang et al.

(10) Patent No.: US 11,652,671 B2
(45) Date of Patent: May 16, 2023

(54) METHODS AND APPARATUS FOR SOUNDING REFERENCE SIGNAL ENHANCEMENTS FOR SUBBAND FULL-DUPLEX

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Wanshi Chen, San Diego, CA (US); Abdelrahman Mohamed Ahmed Mohamed Ibrahim, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/365,722

(22) Filed: Jul. 1, 2021

(65) Prior Publication Data
US 2022/0052882 A1    Feb. 17, 2022

Related U.S. Application Data

(60) Provisional application No. 63/065,185, filed on Aug. 13, 2020.

(51) Int. Cl.
*H04L 25/02* (2006.01)
*H04L 5/00* (2006.01)
*H04L 5/14* (2006.01)

(52) U.S. Cl.
CPC ........ *H04L 25/0226* (2013.01); *H04L 5/0012* (2013.01); *H04L 5/0051* (2013.01); *H04L 5/1423* (2013.01)

(58) Field of Classification Search
CPC . H04L 25/0226; H04L 5/0012; H04L 5/0051; H04L 5/1423
See application file for complete search history.

(56) References Cited

U.S. PATENT DOCUMENTS

| | | | | |
|---|---|---|---|---|
| 2015/0341927 A1* | 11/2015 | Wei | ........................ | H04W 72/14 370/280 |
| 2017/0163404 A1* | 6/2017 | Liu | ..................... | H04W 72/0413 |
| 2018/0070338 A1* | 3/2018 | Wang | ................... | H04W 72/042 |
| 2022/0052882 A1* | 2/2022 | Wang | .................... | H04L 5/0051 |

* cited by examiner

*Primary Examiner* — Shukri Taha
(74) *Attorney, Agent, or Firm* — Arent Fox, LLP

(57) ABSTRACT

Aspects of the present disclosure include methods, apparatuses, and computer readable media for configuring sounding reference signal (SRS) transmissions on subband full-duplex (SBFD) slots. In an example, a user equipment (UE) may determine a change from a first uplink (UL) bandwidth pattern to a second UL bandwidth pattern occurred within in a sub-band full duplex (SBFD) bandwidth. The UE may also configure one or more settings for a sounding resource signal (SRS) transmission based on the second UL bandwidth pattern. The UE may also transmit, to a base station, the SRS transmission according to the one or more settings for the SRS transmission.

28 Claims, 9 Drawing Sheets

METHODS AND APPARATUS FOR SOUNDING REFERENCE SIGNAL ENHANCEMENTS FOR SUBBAND FULL-DUPLEX

CROSS-REFERENCE TO RELATED APPLICATION(S)

This application claims the benefit of U.S. Provisional Application No. 63/065,185, entitled "METHODS AND APPARATUS FOR SOUNDING REFERENCE SIGNAL ENHANCEMENTS FOR SUBBAND FULL-DUPLEX" and filed on Aug. 13, 2020, which is expressly incorporated by reference herein in its entirety.

BACKGROUND

Aspects of the present disclosure relate generally to wireless communications, and more particularly, to apparatuses and methods for sounding reference signal (SRS) enhancements for subband full duplex (SBFD) communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Conventional communication methods may use half duplex communications between devices. Examples of half duplex communications include time division duplexing (TDD) and frequency division duplexing (FDD). In an example, in a half duplex scheme each slot may be designated as a slot for downlink (DL) transmissions or a slot for an uplink (UL) transmissions. Examples of a DL transmission include physical downlink control channel (PDCCH), physical downlink shared channel (PDSCH), and physical broadcast channel (PBCH). Examples of a UL transmission include physical uplink control channel (PUCCH) and physical uplink shared channel (PUSCH). In contrast to half duplex communications, full duplex communications allow devices to communicate via simultaneous UL and DL transmissions. For example, in a sub-band full duplex (SBFD) scheme a slot may be partitioned into both UL and DL transmissions. As configurations for full duplex communications are significantly different from half duplex communications, enhanced resource allocation for sounding reference signals (SRSs), which are transmitted by a user equipment (UE) to a base station to determine channel quality and manage scheduling, are desired.

Aspects of the present disclosure include an example method of wireless communication by a UE. The method may include determining a change from a first UL bandwidth pattern to a second UL bandwidth pattern occurred within an SBFD bandwidth. The method may include configuring one or more settings for an SRS transmission based on the second UL bandwidth pattern. The method may include transmitting, to a base station, the SRS transmission according to the one or more settings for the SRS transmission.

Aspects of the present disclosure also include a method of wireless communication by a base station. The method may include changing a first UL bandwidth pattern to a second UL bandwidth pattern within in an SBFD bandwidth. The method may include receiving, from a UE, an SRS transmission based on one or more settings corresponding to the second UL bandwidth pattern.

Aspects of the present disclosure also include examples of apparatus and computer-readable mediums that perform the methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
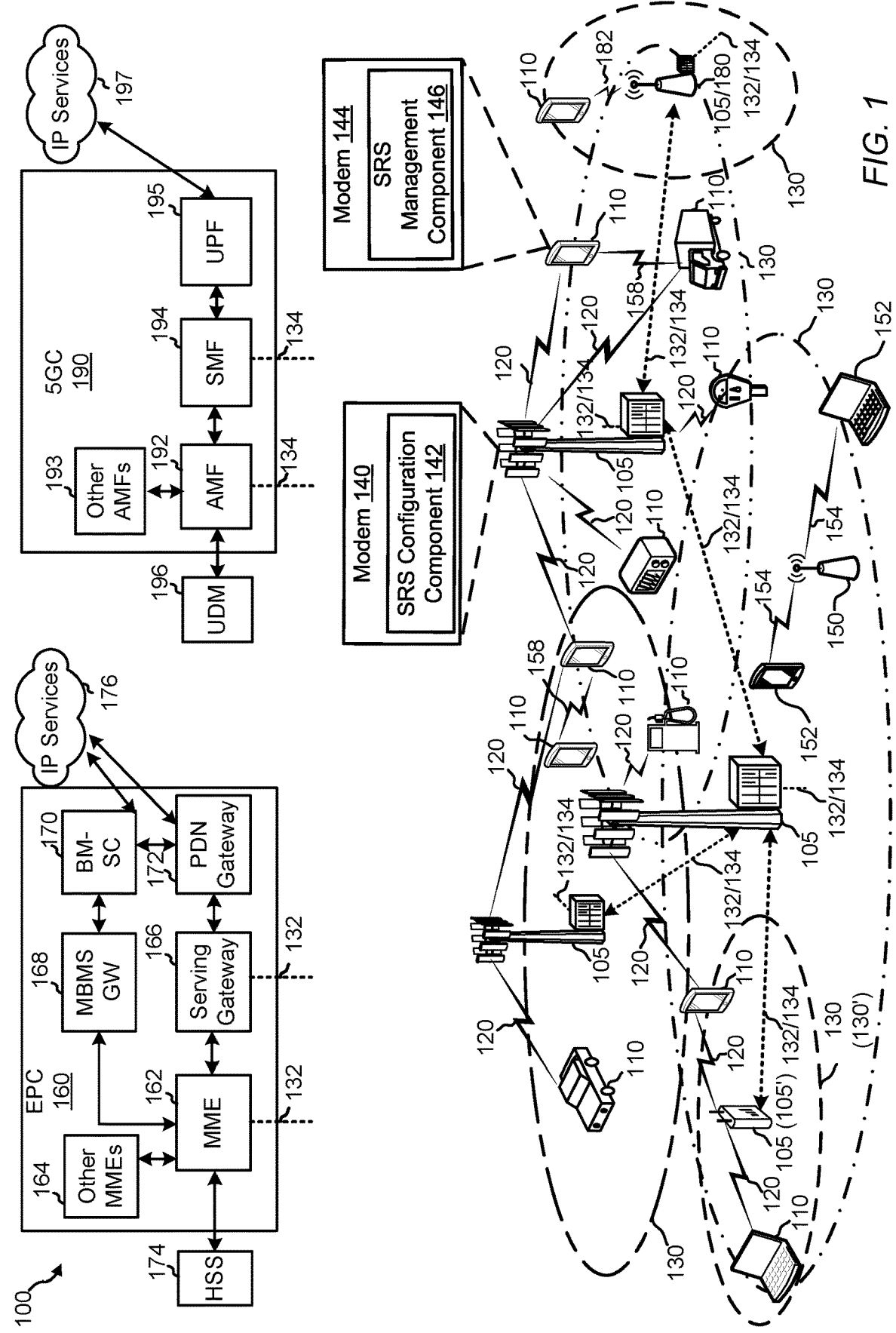
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Sub-band full duplex (SPFD) schemes allow full duplex communications by partitioning slots into both UL transmissions and DL transmissions, as described herein. In an example, a base station may partition component carriers (CC) into UL bandwidths and DL bandwidths to improve cell edge coverage with minimal loss in throughput relative to baseline time division duplex (TDD) macro. Specifically, a UE may transmit UL information (e.g., data or control information) to a base station in the same slot as DL transmissions from the base station, instead of waiting for a next available UL transmission slot, as is the case in conventional half duplex communications. Frequency-division duplex (FDD) may be applied across CCs or within CCs in the case of carrier aggregation in unpaired spectrum.

Aspects of the present disclosure provide techniques for enhancing sounding reference signals (SRSs) in SBFD schemes. In particular, aspects of the present disclosure provide enhanced techniques for configuring SRS schemes, non-uniform hopping, and SRS transmissions in a disjointed UL, all of which were not performed (or allowed) by conventional methods of communications.

FIG. 1 is a diagram illustrating an example of a wireless communications system and an access network 100. The wireless communications system (also referred to as a wireless wide area network (WWAN)) includes at least one base station 105, UEs 110, an Evolved Packet Core (EPC) 160, and a 5G Core (5GC) 190. The base station 105 may include macro cells (high power cellular base station) and/or small cells (low power cellular base station). The macro cells include base stations. The small cells include femtocells, picocells, and microcells.

In some implementations, the base station 105 may include a modem 140 and/or an SRS configuration component 142 for configuring the UE 110 for SRSs in SBFD communication schemes. In some implementations, the UE 110 may include a modem 144 and/or an SRS management component 146 for generating and transmitting SRSs in SBFD communication schemes.

A base station 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
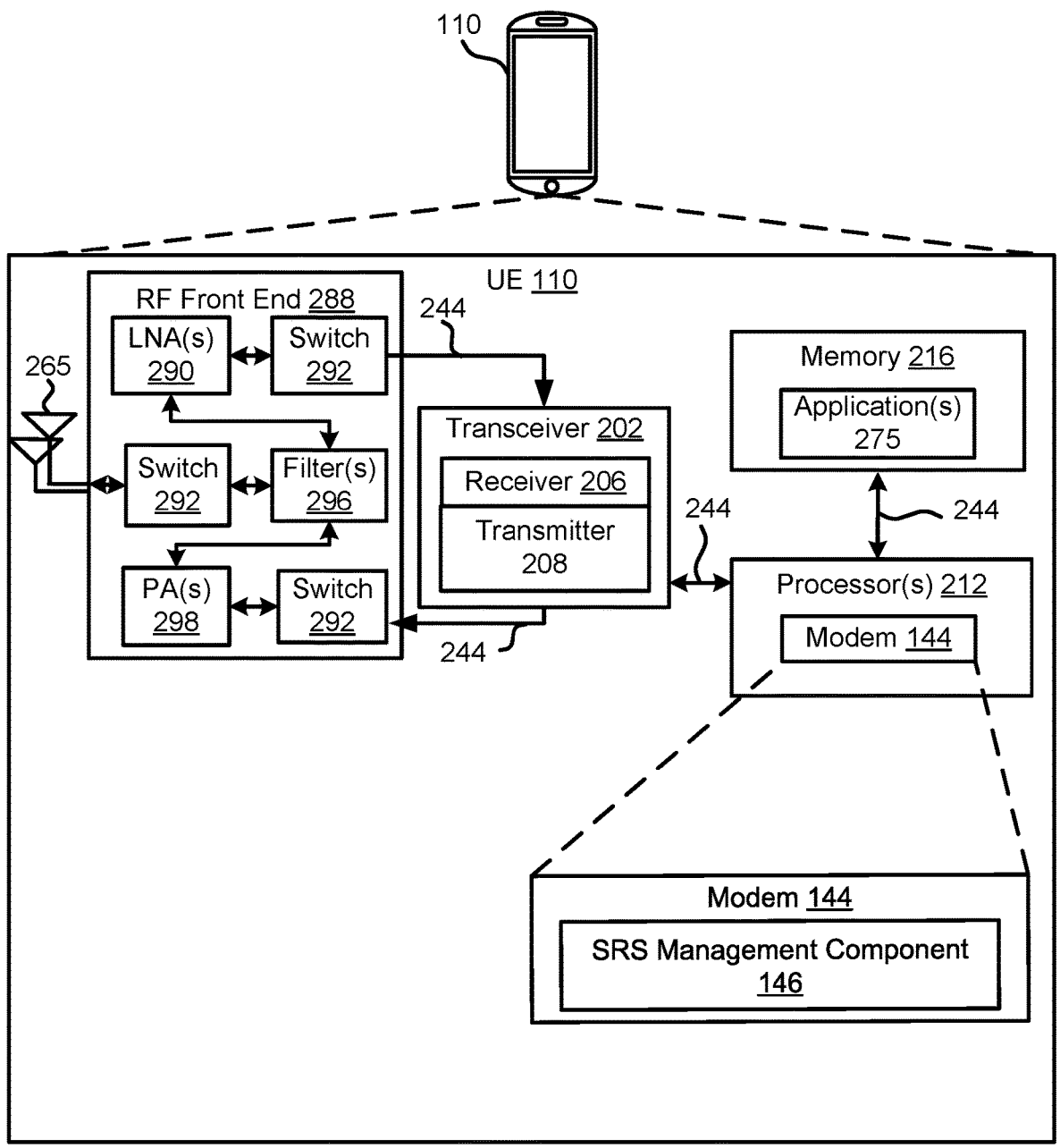
FIG. 2 is a schematic diagram of an example of a user equipment (UE) of FIG. 1, according to aspects of the present disclosure.

Referring to FIG. 2, an example implementation of the UE 110 may include the modem 144 having the SRS management component 146. The modem 144 and/or the SRS management component 146 of the UE 110 may be configured to generate and transmit an SRS to the base station 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 144 and the SRS management component 146 to enable one or more of the functions described herein related to transmitting an SRS to the base station 105. Further, the one or more processors 212, modem 144, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 144 that uses one or more modem processors. The various functions related to the SRS management component 146 may be included in the modem 144 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 144 may configure the UE 110 along with the processors 212. In other aspects, some of the features of the one or more processors 212 and/or the modem 144 associated with the SRS management component 146 may be performed by the transceiver 202.

Also, the memory 216 may be configured to store data used herein and/or local versions of applications 275 or the SRS management component 146 and/or one or more subcomponents of the SRS management component 146 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the SRS management component 146 and/or one or more of its subcomponents, and/or data associated therewith, when the UE 110 is operating at least one processor 212 to execute the SRS management component 146 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the base stations 105 or one or more cells associated with one or more of the base stations 105. In an aspect, for example, the modem 144 may configure the transceiver 202 to operate at a specified frequency and power level based on a UE configuration of the UE 110 and the communication protocol used by the modem 144.

In an aspect, the modem 144 may be a multiband-multimode modem, which may process digital data and communicate with the transceiver 202 such that the digital data is sent and received using the transceiver 202. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 110 (e.g., RF front end 288, transceiver 202) to enable transmission and/or reception of signals from the network based on a specified modem configuration. In an aspect, a modem configuration may be based on the mode of the modem 144 and the frequency band in use. In another aspect, the modem configuration may be based on UE configuration information associated with the UE 110 as provided by the network (e.g., base station 105).

Figure 3:
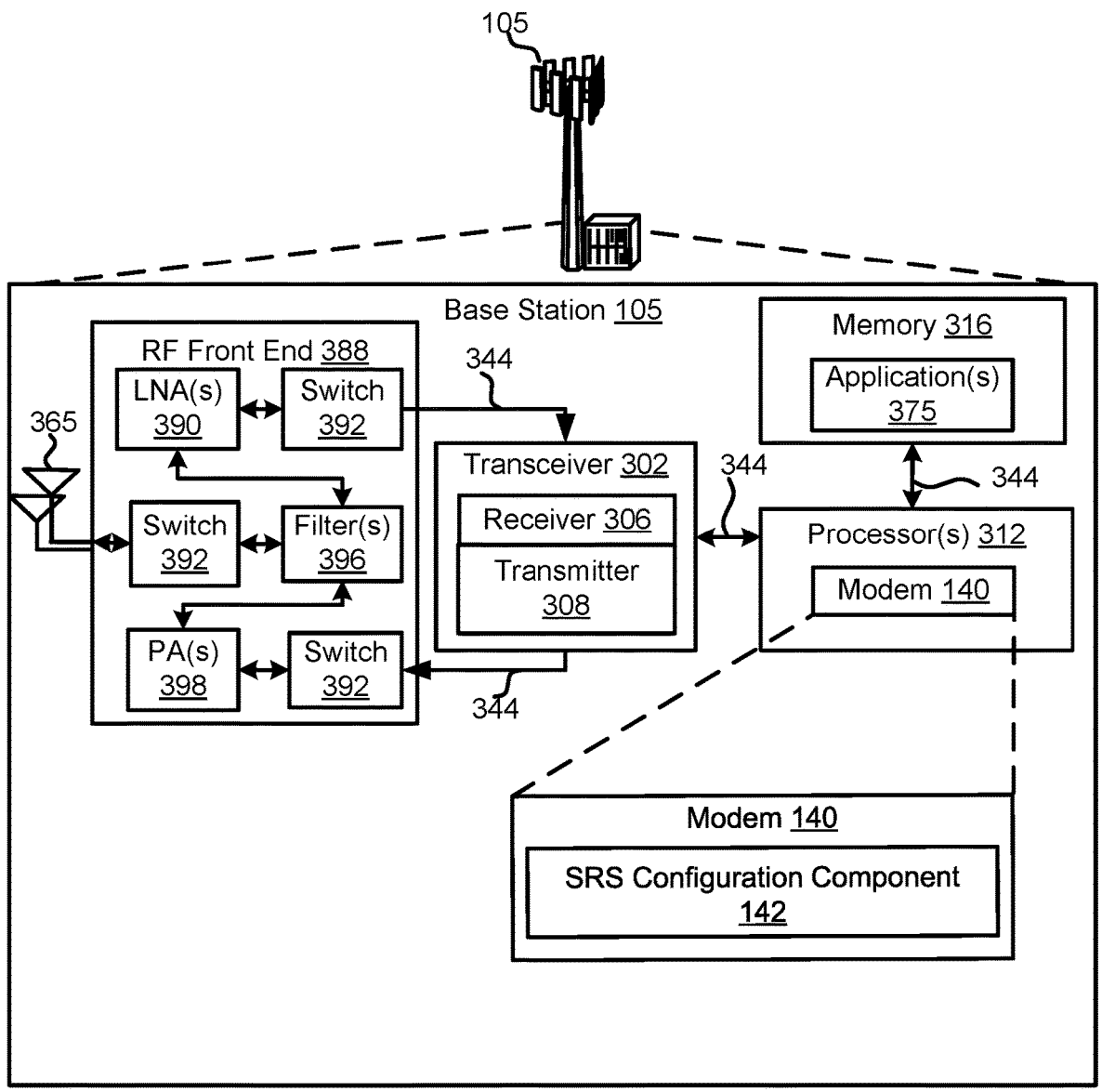
FIG. 3 is a schematic diagram of an example of a base station of FIG. 1, according to aspects of the present disclosure.

Referring to FIG. 3, an example implementation of the base station 105 may include the modem 140 with the SRS configuration component 142 configured to providing SRS configurations to the UE 110. The modem 140 and/or the SRS configuration component 142 of the base station 105 may be configured to communicate with the UE 110 via a cellular network, a Wi-Fi network, or other wireless and wired networks.

In some implementations, the base station 105 may include a variety of components, including components such as one or more processors 312 and memory 316 and transceiver 302 in communication via one or more buses 344, which may operate in conjunction with the modem 140 and the SRS configuration component 142 to enable one or more of the functions described herein related to configuring the UE 110. Further, the one or more processors 312, the modem 140, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 140 that uses one or more modem processors. The various functions related to the SRS configuration component 142 may be included in the modem 140 and/or the processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 140 may configure the base station 105 and the processors 312. In other aspects, some of the features of the one or more processors 312 and/or the modem 140 associated with the SRS configuration component 142 may be performed by the transceiver 302.

Also, the memory 316 may be configured to store data used herein and/or local versions of applications 375 or the SRS configuration component 142, and/or one or more subcomponents of the SRS configuration component 142 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the SRS configuration component 142 and/or one or more of the subcomponents, and/or data associated therewith, when the base station 105 is operating at least one processor 312 to execute the SRS configuration component 142 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by other base stations 105 or wireless transmissions transmitted by the UE 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, transceiver may be tuned to operate at specified frequencies such that the base station 105 may communicate with, for example, the UE 110 or one or more cells associated with one or more base station 105. In an aspect, for example, the modem 140 may configure the transceiver 302 to operate at a specified frequency and power level based on the base station configuration of the base station 105 and the communication protocol used by the modem 140.

In an aspect, the modem 140 may be a multiband-multimode modem, which may process digital data and communicate with the transceiver 302 such that the digital data is sent and received using the transceiver 302. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the base station 105 (e.g., RF front end 388, transceiver 302) to enable transmission and/or reception of signals from the network based on a specified modem configuration. In an aspect, the modem configuration may be based on the mode of the modem 140 and the frequency band in use. In another aspect, the modem configuration may be based on a base station configuration associated with the base station 105.

Figure 4:
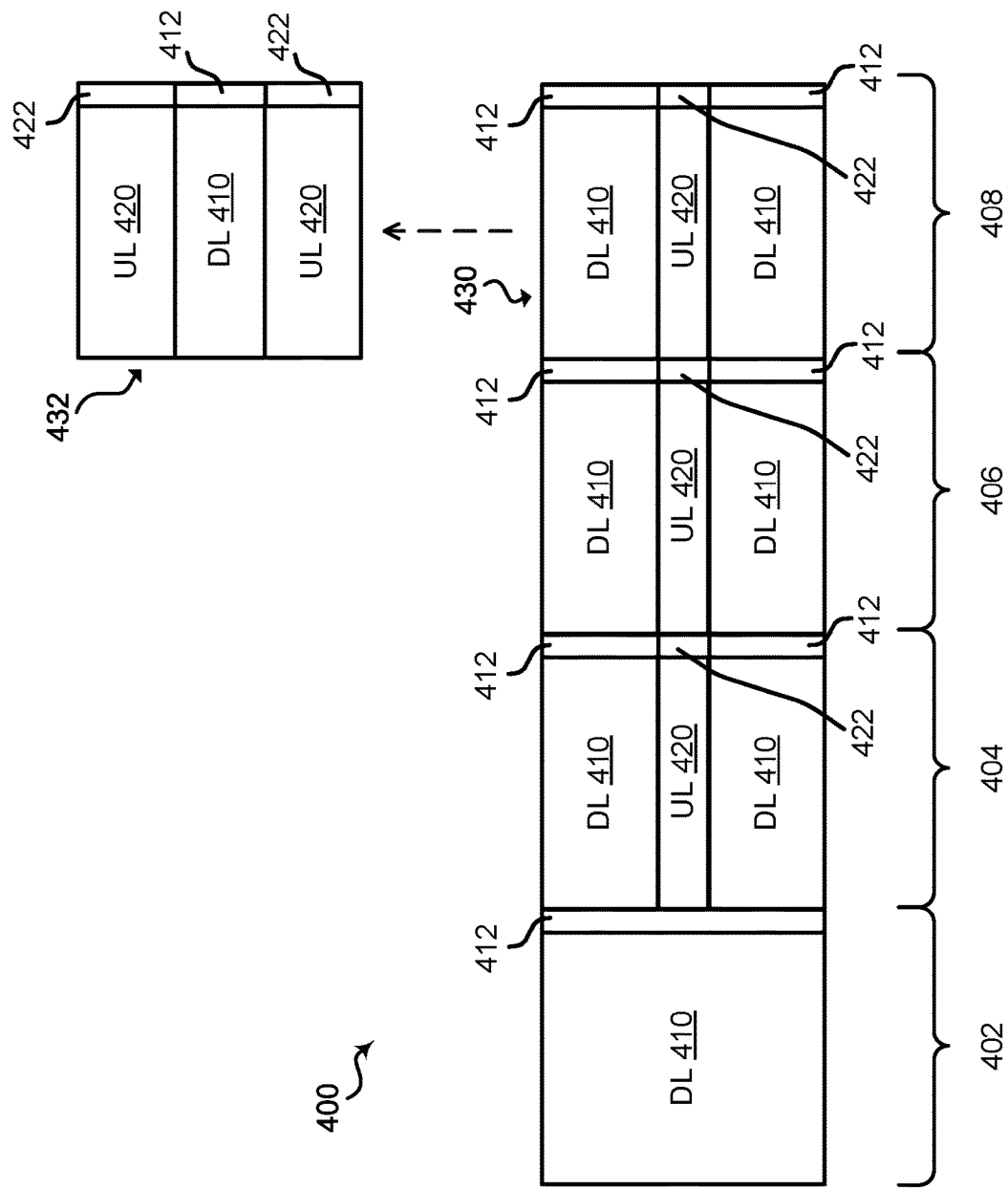
FIG. 4 is schematic diagram of an example of a transmission scheme including a plurality of sub-band full duplex (SBFD) slots, according to aspects of the present disclosure.

Referring to FIG. 4, an example transmission scheme 400 may include a DL slot 402, a first SBFD slot 404, a second SBFD slot 406, and a third SBFD slot 408. The UE 110 may receive DL information (e.g., DL data 410 and/or DL control 412) in the DL slot 402, the first SBFD slot 404, the second SBFD slot 406, and/or the third SBFD slot 408. The UE 110 may transmit UL information (e.g., UL data 420 and/or UL control 422) in the first SBFD slot 404, the second SBFD slot 406, and/or the third SBFD slot 408. If the UE 110 receives any DL information in the DL slot 402, the UE 110 may respond during the first SBFD slot 404. If the UE 110 receives any DL information in the first SBFD slot 404, the second SBFD slot 406, and/or the third SBFD slot 408, the UE 110 may respond in the an UL portion of the same slot as the received DL information instead of postponing to another slot, as may be required by conventional communication schemes.

In an example, the first SBFD slot 404, the second SBFD slot 406, and/or the third SBFD slot 408 may have a same bandwidth pattern (as illustrated by FIG. 4), or different bandwidth patterns.

In an aspect, a bandwidth pattern (or UL bandwidth pattern) of an SBFD slot may be changed to another bandwidth pattern. In an example, as illustrated by FIG. 4, the base station 105 may change allocations of the third SBFD slot 408 to, for example, increase (or decrease) the allocation of UL resources in the SBFD slot 408. For example, the SBFD slot 408 may change from a first bandwidth pattern 430 having a single portion of the SBFD slot 408 allocated for UL information to a second bandwidth pattern 432 having two portions of the SBFD slot 408 allocated for UL information, thereby increasing UL resources. In other examples, a bandwidth pattern may change to decrease the UL resources. One of ordinary skill in the art would recognized that the example transmission scheme 400 is merely one non-limiting example of bandwidth partitioning and other implementations may be used for communications between the base station 105 and the UE 110.

Figure 5:
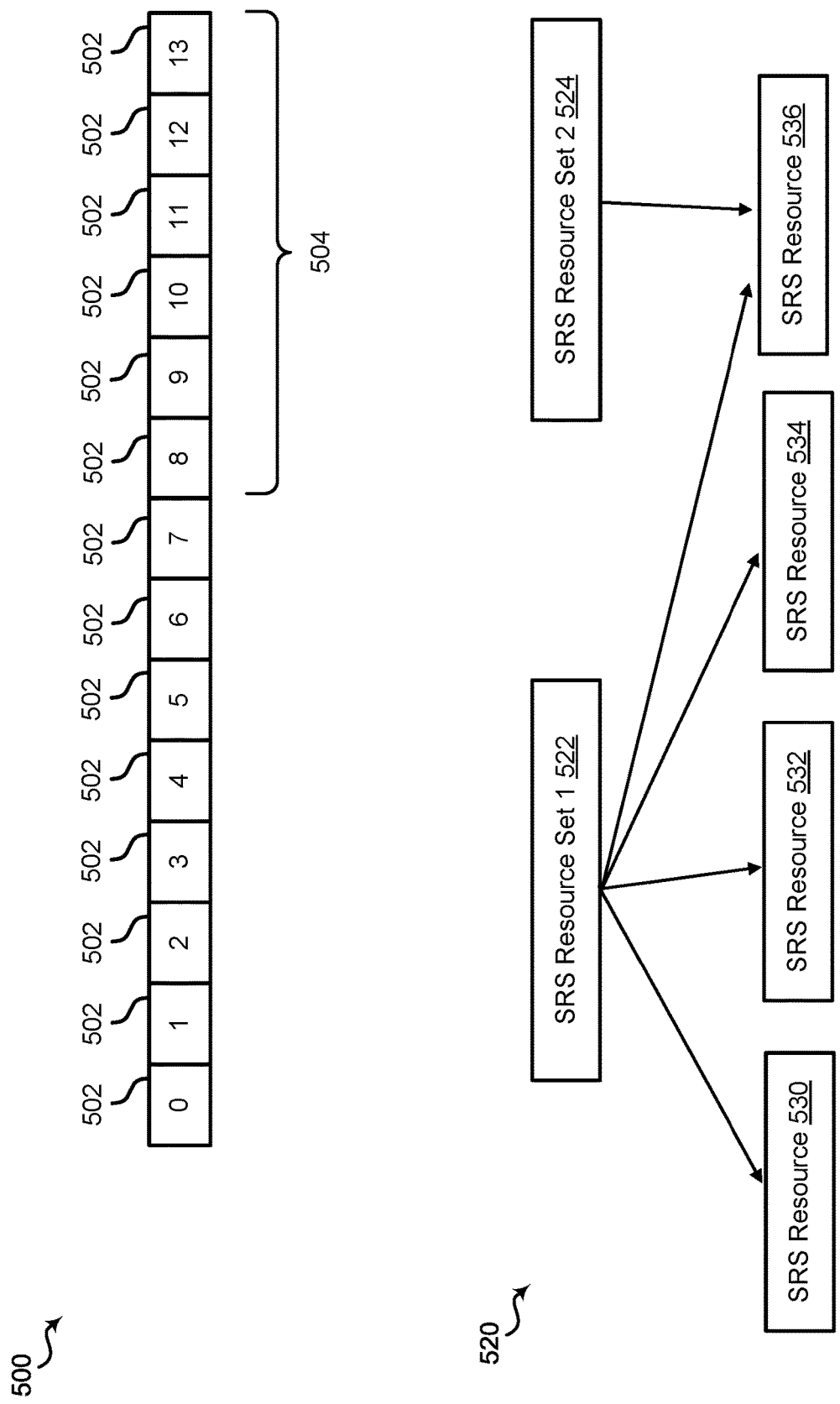
FIG. 5 is block diagram of an example resource slot, according to aspects of the present disclosure.

Referring to FIG. 5, an example resource slot 500 is illustrated. In an aspect, the resource slot 500 may include SRS resources that may span one, two, or four adjacent symbols 502 with up to four ports per SRS resource. In an example, all ports of an SRS resource may be sounded in each symbol 502. In an example, an SRS may only be transmitted in the last symbols 504 of the resource slot 500. In another example, the SRS may only be transmitted after an UL transmission (e.g., PUSCH) in the resource slot 500.

In another aspect, examples of SRS resource set schemes 520 are illustrated. An SRS resource set 522 may contain a set of SRS resources 530, 532, 534, and 536 transmitted by the UE 110. In an example, the SRS resource set 522 may be transmitted aperiodic (e.g., signaled via DL control information (DCI) from the base station 105), semi-persistent, or periodic. In another example, the UE 110 may be configured with multiple resources (e.g., SRS resources 530-536), which may be grouped in the SRS resource set 522 based on a particular use (e.g., antenna switching, codebook-based, non-codebook based, beam management). Further, a second SRS resource set 524 may contain one or more of the same SRS resources 530-536 as the SRS resource set 522. In this example, the second SRS resource set 524 may have a different use than the SRS resource set 522.

In an aspect, an SRS transmission may be wideband/subband. For example, an SRS bandwidth may be a multiple of four physical resource blocks (PRBs).

In an aspect, for an aperiodic SRS (A-SRS) transmission, two bits in the DL or UL DCI may be used by the base station 105 to trigger a transmission of an SRS resource set (e.g., SRS resource set 522 or 524). In an example, each A-SRS resource set may be tagged with either 1, 2, or 3, corresponding to codepoints 01, 10, and 11. In an example, a DCI codepoint 00 may indicate to the UE 110 not to transmit an A-SRS transmission.

In another aspect, each A-SRS set may be configured by the base station 105 via an RRC message using a slot offset from 0 to 32. The slot offset may be an offset in a number of slots between a triggering DCI and the actual transmission of a SRS-resource set. If the base station 105 leaves the slot offset field empty, the UE 110 may apply no offset (e.g., value 0). In an example, once the SRS resource set is selected by the DCI, the slot offset is fixed.

In conventional communication schemes (e.g., half duplex scheme), UL bandwidths remain the same in each slot because each slot is either designated as a DL slot or an UL slot. In contrast, in a SBFD communication scheme, UL and DL bandwidth may change from slot to slot, as illustrated by FIG. 4. Therefore, according to aspects of the present disclosure, if a UL bandwidth change occurs, within SBFD bandwidth, corresponding bandwidth settings for SRSs may also change. In an example, a UL bandwidth may change by either increasing the UL bandwidth or decreasing the UL bandwidth within an SBFD slot (e.g., slots 2-4 of FIG. 4). Examples of UL bandwidth changes are illustrated by the changes between slots 1 and 2, and slots 3 and 4 of FIG. 4. When the UL bandwidth changes, one or more high layer settings (e.g., radio resource control (RRC) settings) may also change.

In an aspect, the UE 110 may be configured to use multiple SRS resources sets for different bandwidth pattern settings. For aspects of the present disclosure, a bandwidth pattern refers to the UL and DL bandwidths and settings used in a SBFD slot or SBFD slots. For example, the UE 110 may receive a configuration message (e.g., RRC message) from the base station 105 to configure mapping between SRS resource sets and bandwidth patterns. In this example, bandwidth pattern identification may be used as a parameter in SRS resource sets or SRS resource sets identification may be configured in bandwidth pattern settings. In another example, the UE 110 may be configured for mapping between SRS resource sets for different bandwidth pattern settings. In this example, SRS resource sets for different BW pattern settings may share a same activate (or trigger) group. Thus, if one SRS resource set corresponding to a first bandwidth pattern (e.g., bandwidth pattern of slot 3) is activated, when the bandwidth pattern changes to a second bandwidth pattern (e.g., bandwidth pattern of slot 4) and SRSs are activated/triggered, the corresponding SRS resource set for the second bandwidth pattern (e.g., bandwidth pattern of slot 4) may also be activated.

In another aspect, the UE 110 may be configured for multiple bandwidth/hopping settings in each SRS resources sets. For example, one SRS resource set may be configured for one or more possible bandwidth patterns with different parameter values for different BW patterns. In another example, when a bandwidth pattern changes (e.g., bandwidth pattern of slot 3 to bandwidth pattern of slot 4), corresponding parameter values of bandwidth/hopping settings may be implemented by the UE 110.

In an aspect, the UE 110 may activate one or more SRS resource sets automatically when a bandwidth pattern changes, if the SRS resource set is periodic or semi-persistent. In another aspect, the UE 110 may deactivate one or more SRS resource sets in response to a change in a bandwidth pattern, if the SRS resource set is semi-persistent.

Figure 6:
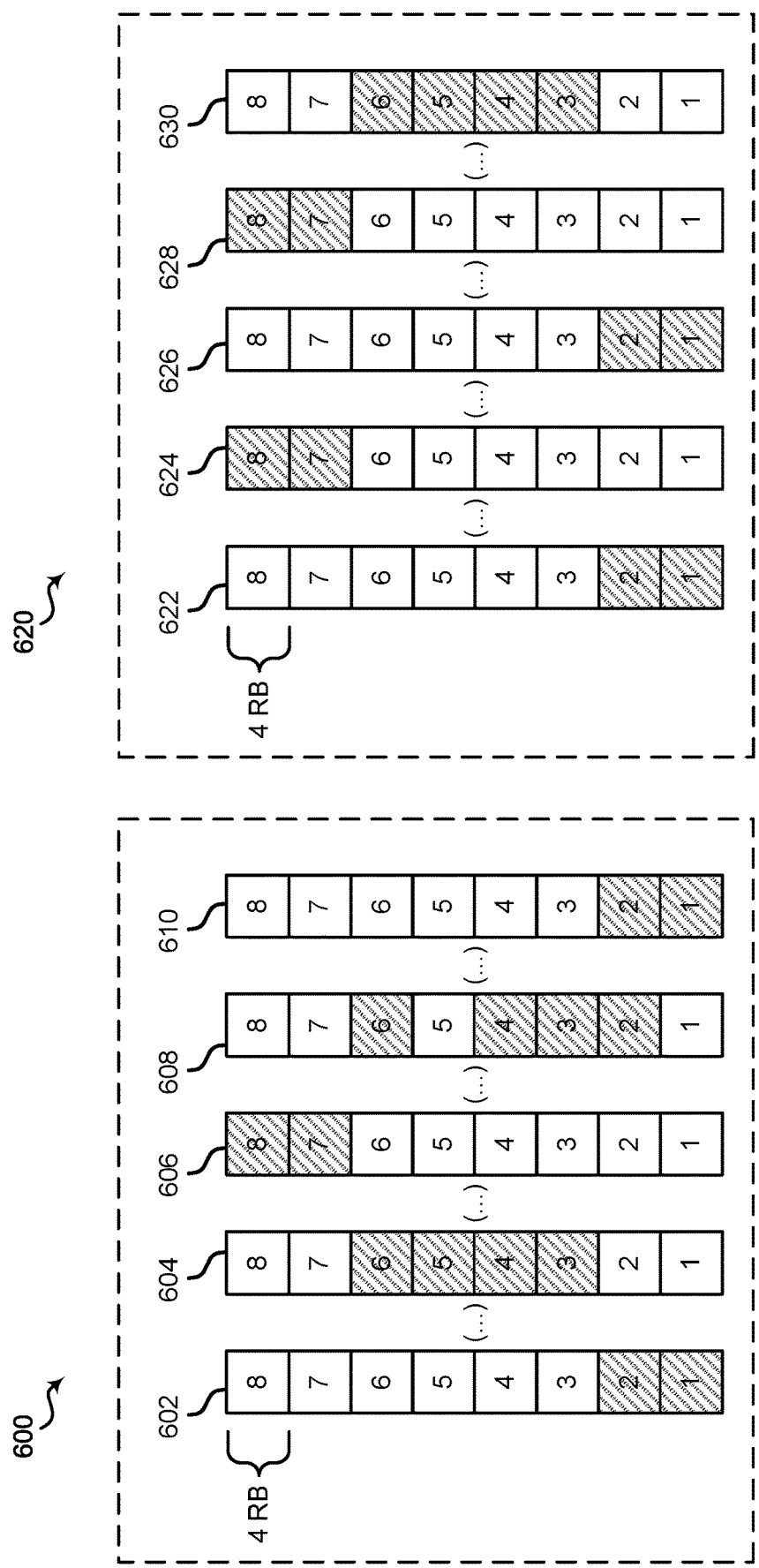
FIG. 6 is a schematic diagram of non-uniform hopping bandwidths and non-uniform sounding reference signal (SRS) signal lengths, according to aspects of the present disclosure.

Referring now to FIG. 6, example implementations 600 and 620 used for non-uniform frequency hopping bandwidths and non-uniform SRS symbol lengths are illustrated. In an aspect, the base station 105 and the UE 110 may be configured to support non-uniform bandwidths and non-uniform SRS lengths for frequency hopping schemes. In an example, non-uniform hopping bandwidths may be used for all bandwidth patterns and may reduce the impact of signal interferences. In an example, non-uniform SRS lengths may be used for all bandwidth patterns and may allow different UEs and different SRS resources to have different settings with the same hopping bandwidth, such that the frequency-division multiplexing can be performed on the SRS transmission.

As illustrated by the example implementations 600 and 620, frequency domains (e.g., frequencies 602, 604, 606, 608, and 610 and frequencies 622, 624, 626, 628, and 630) may include 32 resource blocks (RBs) having a hop size of 4 RBs, leaving 8 frequency hop locations in the frequency domain. In an example, the base station 105 may configure the UE 110 for different bandwidths per hop and different patterns between each hop, where some hops may have more sounding than others. For example, as illustrated by example implementation 600, the SRS may be implemented in the blocks 1 and 2 (8 RBs) of the first frequency 602, hop to blocks 3-6 (16 RBs) of the second frequency 604, hop to blocks 7 and 8 (8 RBs) of the third frequency 606, hop to blocks 2-4 and 6 (16 RBs) of the fourth frequency 608, and hop to blocks 1 and 2 (8 RBs) of the fifth frequency 610.

In another example, the base station 105 and the UE 110 may be configured to support bandwidths per hop or SRS symbols in each hop that are fully overlapped, partially overlapped, or non-overlapped in a frequency domain. For example, the example implementation 600 illustrates a partial overlap between the bandwidth and SRS symbols of block 2 of the frequency 608 and block 2 of the frequency 610.

In another example, the base station 105 and the UE 110 may be configured to support bandwidths per hop that are continuous or discontinuous. For example, the example implementation 600 illustrates continuous bandwidths for blocks 1 and 2 of frequency 602, blocks 3-6 of frequency 604, blocks 7 and 8 of frequency 606, and blocks 1 and 2 of frequency 610, and a non-continuous bandwidth for blocks 2-4 and 6 of frequency 608.

In an aspect, the base station 105 and the UE 110 may be configured to support SRS symbols that are allocated in all bandwidths in each hop (e.g., hop from frequency 622 to frequency 623 illustrate SRS symbols being allocated in same amount of bandwidth—8 RBs) or partial bandwidths (e.g., hop from frequency 604 to frequency 606 illustrate SRS symbols being allocated in partial amount of bandwidth—16 RBs to 8 RBs) in each hop, and also support SRS symbols that are allocated continuously or discontinuously. For example, a whole bandwidth may be 0-9, and SRS transmission can include continuous symbols (e.g., blocks 3-6 are continuous in frequency 604) or discontinuous symbols (e.g., blocks 2-4 and 6 are discontinuous in frequency 608). In an example, the bandwidth and the SRS locations within the bandwidth may be configured by RRC.

In an example, a hop sequence may be {1, 2, 3, 4, 5, 6, 7, 8} or {(1, 2), (3, 4), (5, 6), (7, 8)} as a baseline equal hop scheme. In another example, as illustrated by the example implementation 600, the hop sequence may be {(1, 2), (3, 4, 5, 6), {7, 8}, (2, 3, 4, 6), (1, 2)}. In another example, as illustrated by the example implementation 620, the hop sequence may be {(1, 2), (7, 8), (1, 2), (7, 8), (3, 4, 5, 6)}.

In an aspect, an SRS transmission may be configured to use a hop sequence based on interference and may be different for edge RBs other than center RBs. In this example, non-uniform hopping bandwidths, as described herein, may be used to reduce the impact of interference.

Accordingly, as compared to conventional communication schemes (e.g., half duplex scheme), which may only support uniform bandwidths for each hop and uniform SRS length within each hop, the present disclosure allows non-uniform bandwidths and SRS lengths which may provide flexibility for SRSs if, for example, subcarriers including interference.

Figure 7:
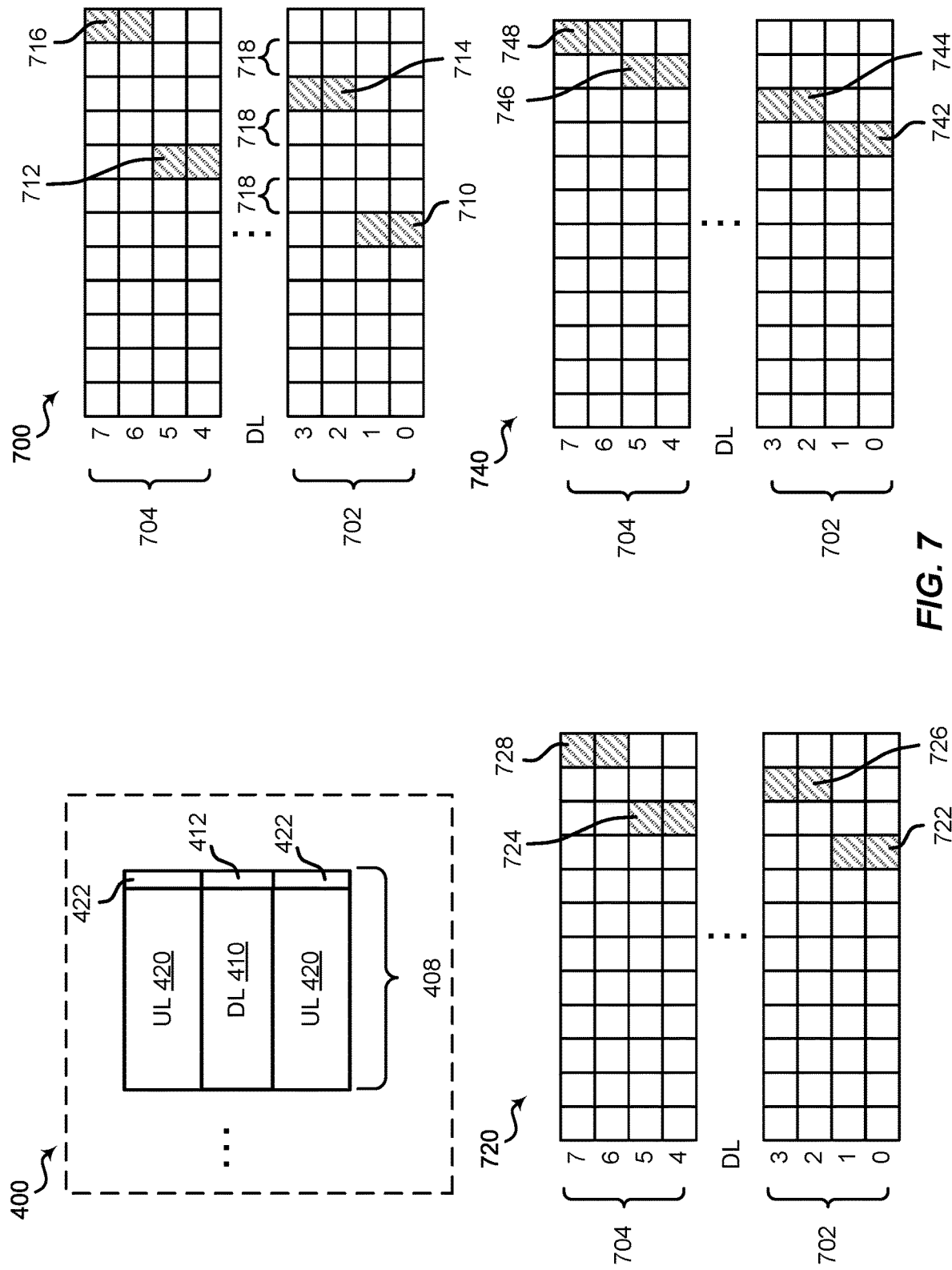
FIG. 7 is a schematic diagram of disjoint UL transmissions, according to aspects of the present disclosure.

Referring to FIG. 7, in aspects of the present disclosure, the base station 105 and the UE 110 may be configured to support wideband disjoint UL bandwidth schemes for SRS transmission. An example of wideband disjoint UL bandwidth scheme may include the SBFD slot 408 of FIG. 4, in which the UL information is separated by the DL information.

In a first example scheme 700, when considering the active UL bandwidth pattern of the SBFD slot 408 as a wideband covering both a lower sub-band 702 and an upper sub-band 704, the base station 105 and the UE 110 may be configured to exclude the DL bandwidth when counting UL RBs. In another example, the base station 105 and the UE 110 may be configured to consider two active UL bandwidth patterns, where each bandwidth pattern covers each of the lower sub-band 702 and the upper sub-band 704, thereby the RB index will be added for both bandwidth patterns.

In another aspect, the base station 105 and the UE 110 may be configured to use one or more guard symbols 718 between SRSs 710 and 712, SRSs 712 and 714, and SRSs 714 and 716, in different sub-bands, as illustrated by the first example scheme 700. The guard symbols 718 may provide the UE 110 with additional time for configuring hardware (e.g., antennas) on the UE 110. In another example, no guard symbol 718 (or retuning gap) may be required for SRSs due to, for example, hardware for the UE 110 not requiring extra time from the guard symbols 718.

In another aspect, the base station 105 and the UE 110 may be configured to perform a first hop (or SRS hop) on one subband then a second hop on another subband, as illustrated by the second example scheme 720. For example, SRS 722 on the lower sub-band 702 may perform the first hop, then SRS 724 on the upper sub-band 704 may perform a second hop, SRS 726 on the lower sub-band 702 may perform a third hop, and SRS 728 on the upper sub-band 704 may perform a fourth hop. In another aspect, the base station 105 and the UE 110 may be configured to have an SRS hop between two subbands. For example, as illustrated by the third example scheme 740, SRSs 742 and 744 on the lower sub-band 702 may perform a hop followed by SRS 746 and 748 on the upper sub-band 704 performing a second hop.

In another aspect, the base station 105 and the UE 110 may be configured based on simultaneous SRS transmissions. For example, the UE 110 may be configured to not allow simultaneous SRS transmissions in two bandwidths (e.g., lower sub-band 702 and upper sub-band 704). In another example, the UE 110 may be configured to allow simultaneous SRS transmissions based on capabilities of the UE 110. In this example, if the UE 110 reports to the base station 105 that the UE 110 can support simultaneous SRS transmissions, the base station 105 may enable simultaneous SRS transmission in both the lower sub-band 702 and the upper sub-band 704.

Figure 8:
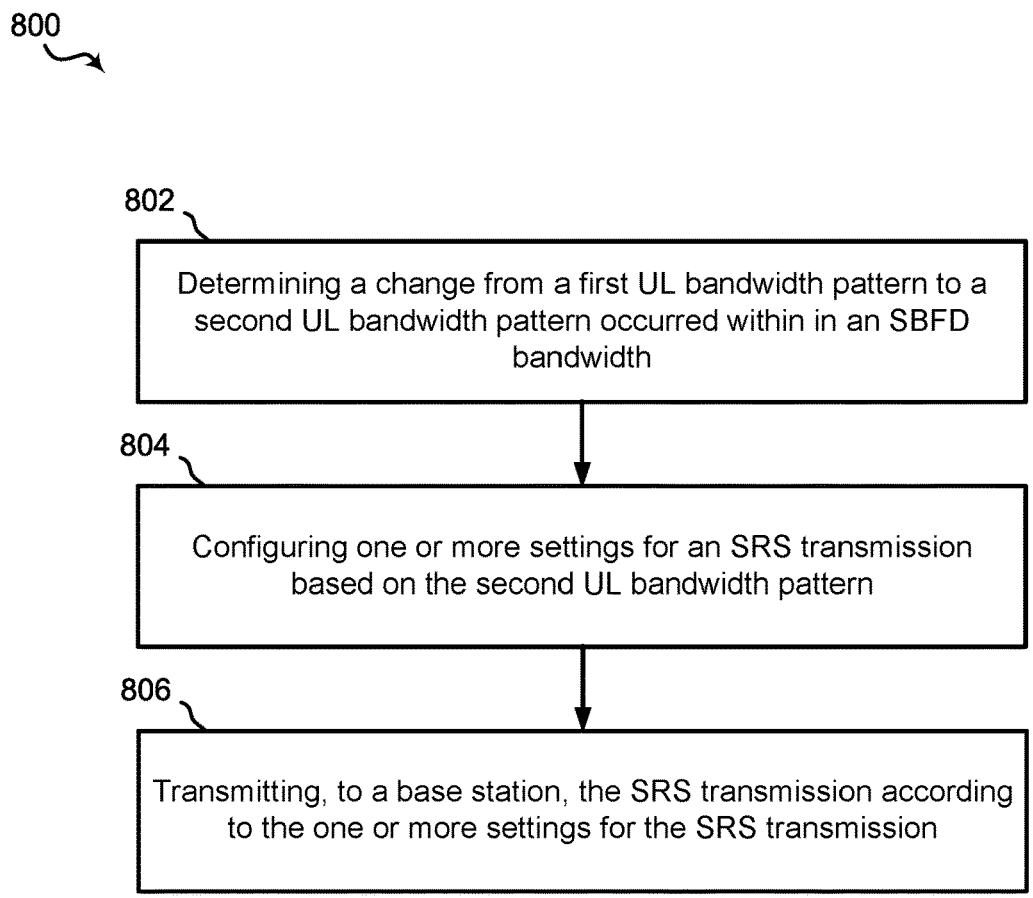
FIG. 8 is a flow diagram of an example method for SRS enhancements for SBFD by a UE, according to aspects of the present disclosure.

Referring to FIG. 8, an example of a method 800 for configuring SRS transmissions on SBFD slots may be performed by the SRS management component 146, the modem 144, the processor 212, and/or the memory 216 of the UE 110 of the wireless communication network 100.

At block 802, the method 800 may include determining a change from a first UL bandwidth pattern to a second UL bandwidth pattern occurred within in an SBFD bandwidth. For example, the SRS management component 146, the modem 144, the processor 212, and/or one or more additional components/subcomponents of the UE 110 may determine a change from a first UL bandwidth pattern 430 to a second UL bandwidth pattern 432 occurred within the SBFD bandwidth slot 408. In an example, the UE 110 may monitor a bandwidth pattern identification of the SBFD slots (e.g., SBFD slot 408) to determine whether a change in pattern occurred. For example, the UE 110 may be preconfigured by high layer parameters, such as RRC (fixed periodic pattern), or may receive a message (e.g., media access control-control element (MAC-CE) or DL control information (DCI), indicating a pattern change.

In certain implementations, the processor 212, the modem 144, the SRS management component 146, and/or one or more other components or subcomponents of the UE 110 may be configured to and/or may define means for determining a change from a first UL bandwidth pattern to a second UL bandwidth pattern occurred within in an SBFD bandwidth.

At block 804, the method 800 may include configuring one or more settings for an SRS transmission based on the second UL bandwidth pattern. For example, the SRS management component 146, the modem 144, the processor 212, and/or one or more other components or subcomponents of the UE 110 may configure one or more settings for an SRS transmission based on the second UL bandwidth pattern 432. In an example, the one or more other settings may include SRS resource set settings, bandwidth hopping settings, SRS symbol length settings, RB index settings, guard symbol settings, and/or simultaneous SRS transmission settings.

In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring one or more settings for an SRS transmission based on the second UL bandwidth pattern.

At block 806, the method 800 may include transmitting, to a base station, the SRS transmission according to the one or more settings for the SRS transmission. For example, the SRS management component 146, the modem 144, the processor 212, the transceiver 202, and/or one or more other components or subcomponents of the UE 110 may transmit, to the base station 105, the SRS transmission according to the one or more settings for the SRS transmission.

In certain implementations, the processor 212, the modem 144, the SRS management component 146, the transceiver 202, the receiver 206, the transmitter 208, the RF front end 288, and/or the subcomponents of the RF front end 288 may be configured to and/or may define means for transmitting, to a base station, the SRS transmission according to the one or more settings for the SRS transmission.

In an example, the method 800 may also include determining of the change by determining one or more of an increase in UL bandwidth occurred, a decrease in the UL bandwidth occurred, or a change in location of DL signal within the SBFD bandwidth occurred. The SRS management component 146, the modem 144, the processor 212, and/or one or more additional components/subcomponents of the UE 110 may determine the change by determining one or more of an increase in UL bandwidth occurred, a decrease in the UL bandwidth occurred, or a change in location of DL signal within the SBFD bandwidth occurred. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for determining of the change by determining one or more of an increase in UL bandwidth occurred, a decrease in the UL bandwidth occurred, or a change in location of DL signal within the SBFD bandwidth occurred.

In an example, the method 800 may also include configuring one or more SRS resource sets based on the second UL bandwidth pattern, wherein the SRS transmission is transmitted on an SRS resource set of the one or more SRS resource sets. The SRS management component 146, the modem 144, the processor 212, and/or one or more other components or subcomponents of the UE 110 may configure one or more SRS resource sets based on the second UL bandwidth pattern, wherein the SRS transmission is transmitted on an SRS resource set of the one or more SRS resource sets. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring one or more SRS resource sets based on the second UL bandwidth pattern, wherein the SRS transmission is transmitted on an SRS resource set of the one or more SRS resource sets.

In an example, the method 800 may also include configuring bandwidth hopping settings for one or more SRS resource sets based on the second UL bandwidth pattern, wherein the SRS transmission is transmitted on an SRS resource set of the one or more SRS resource sets. In another example, the SRS management component 146, the modem 144, the processor 212, and/or one or more other components or subcomponents of the UE 110 may configure bandwidth hopping settings for one or more SRS resource sets based on the second UL bandwidth pattern, wherein the SRS transmission is transmitted on an SRS resource set of the one or more SRS resource sets. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring bandwidth hopping settings for one or more SRS resource sets based on the second UL bandwidth pattern, wherein the SRS transmission is transmitted on an SRS resource set of the one or more SRS resource sets.

In an example, the method 800 may also include activating or deactivating one or more SRS resource sets in response to the determining the change. In another example, the SRS management component 146, the modem 144, the processor 212, and/or one or more other components or subcomponents of the UE 110 may activate or deactivate one or more SRS resource sets in response to the determining the change. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for activating or deactivating one or more SRS resource sets in response to the determining the change.

In an example, the method 800 may also include configuring the SRS transmission for non-uniform hopping bandwidths. In another example, the SRS management component 146, the modem 144, the processor 212, and/or one or more other components or subcomponents of the UE 110 may configure the SRS transmission for non-uniform hopping bandwidths, as illustrated by FIG. 7. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring the SRS transmission for non-uniform hopping bandwidths.

In an example, the method 800 may also include configuring the SRS transmission for non-uniform SRS symbol lengths. In another example, the SRS management component 146, the modem 144, the processor 212, and/or one or more other components or subcomponents of the UE 110 may configure the SRS transmission for non-uniform SRS symbol lengths, as illustrated by FIG. 7. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring the SRS transmission for non-uniform SRS symbol lengths.

In an example, the method 800 may also include determining the second UL bandwidth pattern includes a wideband disjointed UL bandwidth pattern having a first UL bandwidth and a second UL bandwidth separated by a downlink (DL) bandwidth, wherein the configuring of the one or more settings for the sounding resource signal (SRS) comprises: configuring a resource block index setting, a guard symbol setting, a frequency hopping setting, or simultaneous SRS transmission setting based on the wideband disjoint UL bandwidth pattern. In another example, the SRS management component 146, the modem 144, the processor 212, and/or one or more other components or subcomponents of the UE 110 may determine the second UL bandwidth pattern includes a wideband disjointed UL bandwidth pattern having a first UL bandwidth and a second UL bandwidth separated by a downlink (DL) bandwidth, wherein the configuring of the one or more settings for the sounding resource signal (SRS) comprises: configuring a resource block index setting, a guard symbol setting, a frequency hopping setting, or simultaneous SRS transmission setting based on the wideband disjoint UL bandwidth pattern. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for determining the second UL bandwidth pattern includes a wideband disjointed UL bandwidth pattern having a first UL bandwidth and a second UL bandwidth separated by a downlink (DL) bandwidth, wherein the configuring of the one or more settings for the sounding resource signal (SRS) comprises: configuring a resource block index setting, a guard symbol setting, a frequency hopping setting, or simultaneous SRS transmission setting based on the wideband disjoint UL bandwidth pattern.

In an example, the method 800 may also include excluding the DL bandwidth when counting UL resource blocks for the first UL bandwidth and the second UL bandwidth; or consider the first UL bandwidth and the second UL bandwidth as separate active UL bandwidth patterns. In another example, the SRS management component 146, the modem 144, the processor 212, and/or one or more other components or subcomponents of the UE 110 may exclude the DL bandwidth when counting UL resource blocks for the first UL bandwidth and the second UL bandwidth; or consider the first UL bandwidth and the second UL bandwidth as separate active UL bandwidth patterns. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for excluding the DL bandwidth when counting UL resource blocks for the first UL bandwidth and the second UL bandwidth; or consider the first UL bandwidth and the second UL bandwidth as separate active UL bandwidth patterns.

In an example, the method 800 may also include configuring the guard symbol setting by adding one or more guard symbols between one or more SRS transmissions in the first UL bandwidth and the second UL bandwidth; or excluding a guard symbol based on hardware of the UE. In another example, the SRS management component 146, the modem 144, the processor 212, and/or one or more other components or subcomponents of the UE 110 may configure the guard symbol setting by adding one or more guard symbols between one or more SRS transmissions in the first UL bandwidth and the second UL bandwidth; or excluding a guard symbol based on hardware of the UE. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring the guard symbol setting by adding one or more guard symbols between one or more SRS transmissions in the first UL bandwidth and the second UL bandwidth; or excluding a guard symbol based on hardware of the UE.

In an example, the method 800 may also include configuring the frequency hopping setting by frequency hopping from the first UL subband to the second UL subband after a plurality of SRS transmissions; or frequency hopping from the first UL subband to the second UL subband for each SRS. In another example, the SRS management component 146, the modem 144, the processor 212, and/or one or more other components or subcomponents of the UE 110 may configure the frequency hopping setting by frequency hopping from the first UL subband to the second UL subband after a plurality of SRS transmissions; or frequency hopping from the first UL subband to the second UL subband for each SRS. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring the frequency hopping setting by frequency hopping from the first UL subband to the second UL subband after a plurality of SRS transmissions; or frequency hopping from the first UL subband to the second UL subband for each SRS.

In an example, the method 800 may also include configuring the simultaneous SRS setting by restricting simultaneous transmission of the SRS transmission in the first UL subband and the second UL subband; or allowing the simultaneous transmission of the SRS transmission based on one or more capabilities of the UE. In another example, the SRS management component 146, the modem 144, the processor 212, and/or one or more other components or subcomponents of the UE 110 may configure the simultaneous SRS setting by restricting simultaneous transmission of the SRS transmission in the first UL subband and the second UL subband; or allowing the simultaneous transmission of the SRS transmission based on one or more capabilities of the UE. In certain implementations, the processor 212, the modem 144, the SRS management component 146, the transceiver 202, the receiver 206, the transmitter 208, the RF front end 288, and/or the subcomponents of the RF front end 288 may be configured to and/or may define means for configuring the simultaneous SRS setting by restricting simultaneous transmission of the SRS transmission in the first UL subband and the second UL subband; or allowing the simultaneous transmission of the SRS transmission based on one or more capabilities of the UE.

Figure 9:
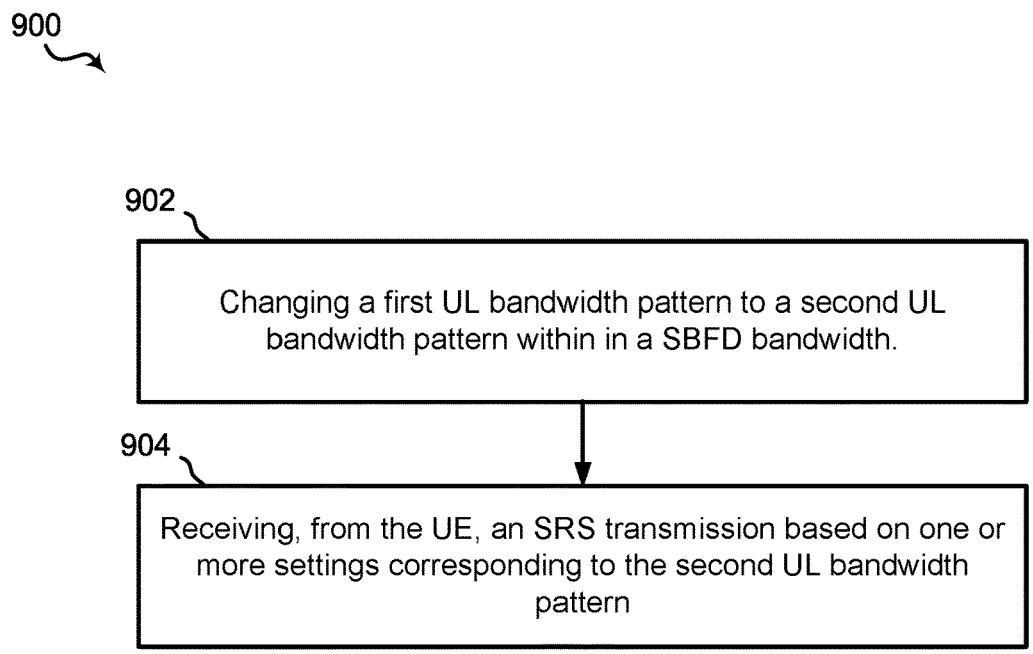
FIG. 9 is flow diagram of an example method for SRS enhancements for SBFD by a base station, according to aspects of the present disclosure.

Referring to FIG. 9, an example of a method 900 for configuring SRS transmissions on SBFD slots may be performed by the SRS configuration component 142, the modem 140, the processor 312, the memory 316, and/or one or more additional components/subcomponents of the base station 105 in the wireless communication network 100.

At block 902, the method 900 may include changing a first UL bandwidth pattern to a second UL bandwidth pattern within in a SBFD bandwidth. For example, the SRS configuration component 142, the modem 140, the processor 312, the memory 316, and/or one or more components/subcomponents of the base station 105 may change the first UL bandwidth pattern 430 to the second UL bandwidth pattern 432 within in a SBFD bandwidth 408.

In certain implementations, the processor 312, the modem 140, the SRS configuration component 142, the transceiver 302, the receiver 306, the transmitter 308, the RF front end 388, and/or the subcomponents of the RF front end 388 may be configured to and/or may define means for changing a first UL bandwidth pattern to a second UL bandwidth pattern within in a SBFD bandwidth.

At block 904, the method 900 may include receiving, from the UE, an SRS transmission based on one or more settings corresponding to the second UL bandwidth pattern. For example, the SRS configuration component 142, the modem 140, and/or the processor 312 of the base station 105 may receive, from the UE 110, an SRS transmission based on one or more settings corresponding to the second UL bandwidth pattern 432

In certain implementations, the processor 312, the modem 140, the SRS configuration component 142, the transceiver 302, the receiver 306, the transmitter 308, the RF front end 388, and/or the subcomponents of the RF front end 388 may be configured to and/or may define means for receiving, from the UE, an SRS transmission based on one or more settings corresponding to the second UL bandwidth pattern.

Additional Implementations

An example method of wireless communication by a user equipment (UE), comprising: determining a change from a first uplink (UL) bandwidth pattern to a second UL bandwidth pattern occurred within a sub-band full duplex (SBFD) bandwidth; configuring one or more settings for a sounding resource signal (SRS) transmission based on the second UL bandwidth pattern; and transmitting, to a base station, the SRS transmission according to the one or more settings for the SRS transmission.

The above example method wherein the determining of the change comprises: determining one or more of an increase in UL bandwidth occurred, a decrease in the UL bandwidth occurred, or a change in location of a downlink (DL) signal within the SBFD bandwidth occurred.

One or more of the above-example methods wherein the configuring of the one or more settings for the SRS transmission comprises: configuring one or more SRS resource sets based on the second UL bandwidth pattern, wherein the SRS transmission is transmitted on an SRS resource set of the one or more SRS resource sets.

One or more of the above-example methods wherein the configuring of the one or more settings for the SRS transmission comprises: configuring bandwidth hopping settings for one or more SRS resource sets based on the second UL bandwidth pattern, wherein the SRS transmission is transmitted on an SRS resource set of the one or more SRS resource sets.

One or more of the above-example methods further comprising: activating or deactivating one or more SRS resource sets in response to the determining the change.

One or more of the above-example methods wherein the configuring of the one or more settings for the SRS transmission comprises: configuring the SRS transmission for non-uniform hopping bandwidths.

One or more of the above-example methods wherein the configuring of the one or more settings for the SRS transmission comprises: configuring the SRS transmission for non-uniform SRS symbol lengths.

One or more of the above-example methods further comprising: determining the second UL bandwidth pattern includes a wideband disjointed UL bandwidth pattern having a first UL bandwidth and a second UL bandwidth separated by a downlink (DL) bandwidth, wherein the configuring of the one or more settings for the SRS transmission comprises: configuring a resource block index setting, a guard symbol setting, a frequency hopping setting, or simultaneous SRS transmission setting based on the wideband disjointed UL bandwidth pattern.

One or more of the above-example methods wherein configuring the resource block index setting comprises: excluding the DL bandwidth when counting UL resource blocks for the first UL bandwidth and the second UL bandwidth; or considering the first UL bandwidth and the second UL bandwidth as separate active UL bandwidth patterns.

One or more of the above-example methods wherein configuring the guard symbol setting comprises: adding one or more guard symbols between one or more SRS transmissions in the first UL bandwidth and the second UL bandwidth; or excluding a guard symbol based on hardware of the UE.

One or more of the above-example methods wherein configuring the frequency hopping setting comprises: frequency hopping from the first UL bandwidth to the second UL bandwidth after a plurality of SRS transmissions; or frequency hopping from the first UL bandwidth to the second UL bandwidth for each SRS.

One or more of the above-example methods wherein configuring the simultaneous SRS transmission setting comprises: restricting simultaneous transmission of the SRS transmission in the first UL bandwidth and the second UL bandwidth; or allowing the simultaneous transmission of the SRS transmission based on one or more capabilities of the UE.

An example apparatus comprising a memory configured to store instructions, and one or more processors communicatively coupled with the memory, wherein the one or more processors are configured to perform all or part of one or more of the above example methods.

An example apparatus comprising means for wireless communication, means for storing instructions and data, and means for performing all or part of one or more of the above example methods.

An example computer-readable medium having instructions stored therein that, when executed by one or more processors, cause the one or more processors to perform all or part of one or more of the above example methods.

A second example method of wireless communication by a base station, comprising: changing a first uplink (UL) bandwidth pattern to a second UL bandwidth pattern within in a sub-band full duplex (SBFD) bandwidth; and receiving, from a user equipment (UE), a sounding reference signal (SRS) transmission based on one or more settings corresponding to the second UL bandwidth pattern.

A second example apparatus comprising a memory configured to store instructions, and one or more processors communicatively coupled with the memory, wherein the one or more processors are configured to perform all or part of one or more of the above second example methods.

A second example apparatus comprising means for wireless communication, means for storing instructions and data, and means for performing all or part of one or more of the above second example methods.

A second example computer-readable medium having instructions stored therein that, when executed by one or more processors, cause the one or more processors to perform all or part of one or more of the above second example methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   determining a change from a first uplink (UL) bandwidth pattern to a second UL bandwidth pattern occurred within a sub-band full duplex (SBFD) bandwidth;
   configuring one or more settings for a sounding resource signal (SRS) transmission based on the second UL bandwidth pattern; and
   transmitting, to a base station, the SRS transmission according to the one or more settings for the SRS transmission.

2. The method of claim 1, wherein the determining of the change comprises:
   determining one or more of an increase in UL bandwidth occurred, a decrease in the UL bandwidth occurred, or a change in location of a downlink (DL) signal within the SBFD bandwidth occurred.

3. The method of claim 1, wherein the configuring of the one or more settings for the SRS transmission comprises:
   configuring one or more SRS resource sets based on the second UL bandwidth pattern, wherein the SRS transmission is transmitted on an SRS resource set of the one or more SRS resource sets.

4. The method of claim 1, wherein the configuring of the one or more settings for the SRS transmission comprises:
   configuring bandwidth hopping settings for one or more SRS resource sets based on the second UL bandwidth pattern, wherein the SRS transmission is transmitted on an SRS resource set of the one or more SRS resource sets.

5. The method of claim 1, further comprising:
   activating or deactivating one or more SRS resource sets in response to the determining the change.

6. The method of claim 1, wherein the configuring of the one or more settings for the SRS transmission comprises:
   configuring the SRS transmission for non-uniform hopping bandwidths.

7. The method of claim 1, wherein the configuring of the one or more settings for the SRS transmission comprises:
   configuring the SRS transmission for non-uniform SRS symbol lengths.

8. The method of claim 1, further comprising:
   determining the second UL bandwidth pattern includes a wideband disjointed UL bandwidth pattern having a first UL bandwidth and a second UL bandwidth separated by a downlink (DL) bandwidth,
   wherein the configuring of the one or more settings for the SRS transmission comprises:
      configuring a resource block index setting, a guard symbol setting, a frequency hopping setting, or a simultaneous SRS transmission setting based on the wideband disjointed UL bandwidth pattern.

9. The method of claim 8, wherein configuring the resource block index setting comprises:
   excluding the DL bandwidth when counting UL resource blocks for the first UL bandwidth and the second UL bandwidth; or
   considering the first UL bandwidth and the second UL bandwidth as separate active UL bandwidth patterns.

10. The method of claim 8, wherein configuring the guard symbol setting comprises:

adding one or more guard symbols between one or more SRS transmissions in the first UL bandwidth and the second UL bandwidth; or excluding a guard symbol based on hardware of the UE.

11. The method of claim 8, wherein configuring the frequency hopping setting comprises:
frequency hopping from the first UL bandwidth to the second UL bandwidth after a plurality of SRS transmissions; or
frequency hopping from the first UL bandwidth to the second UL bandwidth for each SRS.

12. The method of claim 8, wherein configuring the simultaneous SRS transmission setting comprises:
restricting simultaneous transmission of the SRS transmission in the first UL bandwidth and the second UL bandwidth; or
allowing the simultaneous transmission of the SRS transmission based on one or more capabilities of the UE.

13. A method of wireless communication by a base station, comprising:
changing a first uplink (UL) bandwidth pattern to a second UL bandwidth pattern within a sub-band full duplex (SBFD) bandwidth; and
receiving, from a user equipment (UE), a sounding reference signal (SRS) transmission based on one or more settings corresponding to the second UL bandwidth pattern.

14. The method of claim 13, wherein the first UL bandwidth pattern changes to the second UL bandwidth pattern based on one or more of an increase in UL bandwidth, a decrease in the UL bandwidth, or a change in location of a downlink (DL) signal within the SBFD bandwidth.

15. A user equipment (UE), comprising:
a memory storing instructions; and
one or more processors coupled with the memory and configured to:
determine a change from a first uplink (UL) bandwidth pattern to a second UL bandwidth pattern occurred within a sub-band full duplex (SBFD) bandwidth;
configure one or more settings for a sounding resource signal (SRS) transmission based on the second UL bandwidth pattern; and
transmit, to a base station, the SRS transmission according to the one or more settings for the SRS transmission.

16. The UE of claim 15, wherein the one or more processors is configured to determine the change from the first UL bandwidth pattern to the second UL bandwidth pattern based on one or more of an increase in UL bandwidth, a decrease in the UL bandwidth, or a change in location of a downlink (DL) signal within the SBFD bandwidth.

17. The UE of claim 15, wherein the one or more processors is further configured to:
configure one or more SRS resource sets based on the second UL bandwidth pattern, wherein the SRS transmission is transmitted on an SRS resource set of the one or more SRS resource sets.

18. The UE of claim 15, wherein the one or more processors is further configured to:
configure bandwidth hopping settings for one or more SRS resource sets based on the second UL bandwidth pattern, wherein the SRS transmission is transmitted on an SRS resource set of the one or more SRS resource sets.

19. The UE of claim 15, wherein the one or more processors is further configured to:

activate or deactivate one or more SRS resource sets in response to the change being determined.

20. The UE of claim 15, wherein the one or more processors is further configured to:
configure the SRS transmission for non-uniform hopping bandwidths.

21. The UE of claim 15, wherein the one or more processors is further configured to:
configure the SRS transmission for non-uniform SRS symbol lengths.

22. The UE of claim 15, wherein the one or more processors is further configured to:
determine the second UL bandwidth pattern includes a wideband disjointed UL bandwidth pattern having a first UL bandwidth and a second UL bandwidth separated by a downlink (DL) bandwidth, wherein the one or more settings for the SRS transmission is configured to include a resource block index setting, a guard symbol setting, a frequency hopping setting, or a simultaneous SRS transmission setting based on the wideband disjointed UL bandwidth pattern.

23. The UE of claim 22, wherein the one or more processors is further configured to:
exclude the DL bandwidth when counting UL resource blocks for the first UL bandwidth and the second UL bandwidth; or
consider the first UL bandwidth and the second UL bandwidth as separate active UL bandwidth patterns.

24. The UE of claim 22, wherein the one or more processors is further configured to:
add one or more guard symbols between one or more SRS transmissions in the first UL bandwidth and the second UL bandwidth; or
exclude a guard symbol based on hardware of the UE.

25. The UE of claim 22, wherein the one or more processors is further configured to:
frequency hop from the first UL bandwidth to the second UL bandwidth after a plurality of SRS transmissions; or
frequency hop from the first UL bandwidth to the second UL bandwidth for each SRS.

26. The UE of claim 22, wherein the one or more processors is further configured to:
restrict simultaneous transmission of the SRS transmission in the first UL bandwidth and the second UL bandwidth; or
allow the simultaneous transmission of the SRS transmission based on one or more capabilities of the UE.

27. A base station, comprising:
a memory storing instructions; and
one or more processors coupled with the memory and configured to:
change a first uplink (UL) bandwidth pattern to a second UL bandwidth pattern within a sub-band full duplex (SBFD) bandwidth; and
receive, from a user equipment (UE), a sounding reference signal (SRS) transmission based on one or more settings corresponding to the second UL bandwidth pattern.

28. The base station of claim 27, herein the one or more processors is configured to change from the first UL bandwidth pattern to the second UL bandwidth pattern based on one or more of an increase in UL bandwidth, a decrease in the UL bandwidth, or a change in location of a downlink (DL) signal within the SBFD bandwidth.

* * * * *